Figure 1:
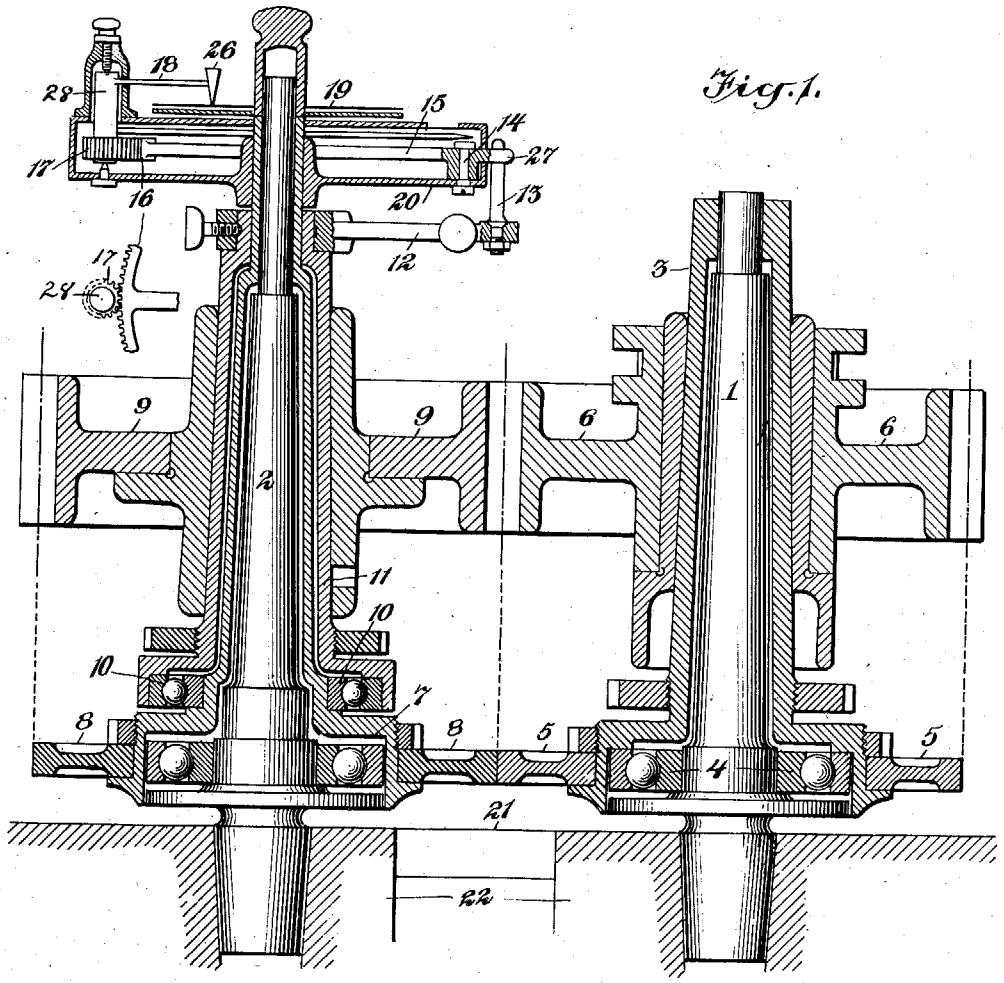

H. SAURER.

APPARATUS FOR TESTING THE TEETH OF GEAR WHEELS.

APPLICATION FILED APR. 10, 1920.

Reissued Dec. 21, 1920.

15,013.

2 SHEETS—SHEET 1.

Inventor
Hippolyt Saurer
By his Attorney
W. Fairbank

H. SAURER.

APPARATUS FOR TESTING THE TEETH OF GEAR WHEELS.

APPLICATION FILED APR. 10, 1920.

Reissued Dec. 21, 1920.

15,013.

2 SHEETS—SHEET 2.

Hermann Saurer Inventor

By his Attorney

C. W. Fairbank

UNITED STATES PATENT OFFICE.

HIPPOLYT SAURER, OF ARBON, SWITZERLAND.

APPARATUS FOR TESTING THE TEETH OF GEAR-WHEELS.

15,013. Specification of Reissued Letters Patent. Reissued Dec. 21, 1920.

Original No. 1,263,472, dated April 23, 1918, Serial No. 33,706, filed June 12, 1915. Application for reissue filed April 10, 1920. Serial No. 372,983.

*To all whom it may concern:*

Be it known that I, HIPPOLYT SAURER, a citizen of Switzerland, residing at Arbon, Switzerland, have invented new and useful Improvements in Apparatus for Testing the Teeth of Gear-Wheels, of which the following is a specification.

My invention relates to improvements in apparatus for testing the teeth of gear wheels whereby the inaccuracies of the working faces of the teeth are indicated. If the teeth of one or both of a pair of intermeshing gears be inaccurately formed, one of the pair, for instance the driving gear, may be turned at any desired speed while the other, namely the driven gear, will have an irregular or jerky movement including successive accelerations and retardations in respect to the speed of the driving gear, as successive teeth come into or pass out of mesh. These comparatively slight speed variations of the driven gear above and below the mean or average speed determined by the speed of the driving gear and the relative pitch diameters cause noise, excessive wear, friction losses and other undesirable results.

The object of my invention is to provide an apparatus in which commercially made pairs of gears of various different sizes and relative pitch diameters may be inserted and tested and the ordinarily comparatively slight inaccuracies be clearly shown and recorded on a greatly enlarged scale.

In carrying out my invention I provide an indicating member, preferably in the form of a stylus or other recording member movable in respect to two separate axes, and control its movement by two coaxial rotatable controlling members having separate driving connections from the separate gears to be tested. The driving mechanism includes interchangeable part or parts so designed that the coaxial controlling members for the stylus may be rotated at approximately the same speed even though the gears being tested have different pitch diameters and therefore rotate at different speeds. Thus for perfectly formed teeth the two members may rotate at approximately the same uniform speed and the stylus will move in respect to only one of its axes and trace a smooth curve. Variations in the relative rates of rotation of the gears due to gear teeth inaccuracies or other cause will give to the stylus a secondary movement about its other axis due to alternate acceleration and retardation of the driven gear and its stylus controller.

As a preferred embodiment and as an important structural feature I mount the two coaxial stylus controlling members coaxial with the support for one of the gears to be tested. This permits one to be rigidly connected to one gear support. Motion is transmitted to the other stylus controlling member from the other gear support by a suitable pair of disks, the diameters of which may be in the same ratio as the diameters of the pitch circles of the gears to be tested. Preferably they have the same diameters as said pitch circles and are mounted coaxial with the gears with their peripheries in frictional driving engagement, one disk being rigid with its corresponding gear and stylus controller and the other disk being rigidly connected to the other stylus controlling member but loose in respect of the gear coaxial therewith. Thus as the gears rotate, motion will be directly communicated to one stylus controlling member from the gear coaxial therewith and motion will be communicated to the other stylus controlling member from the other gear through the friction disks. Any tooth inaccuracy causing relative speed variation of one of the gear wheels therefore causes an irregular, zig-zag or secondary movement of the stylus which may be easily noted and recorded.

Figure 2:
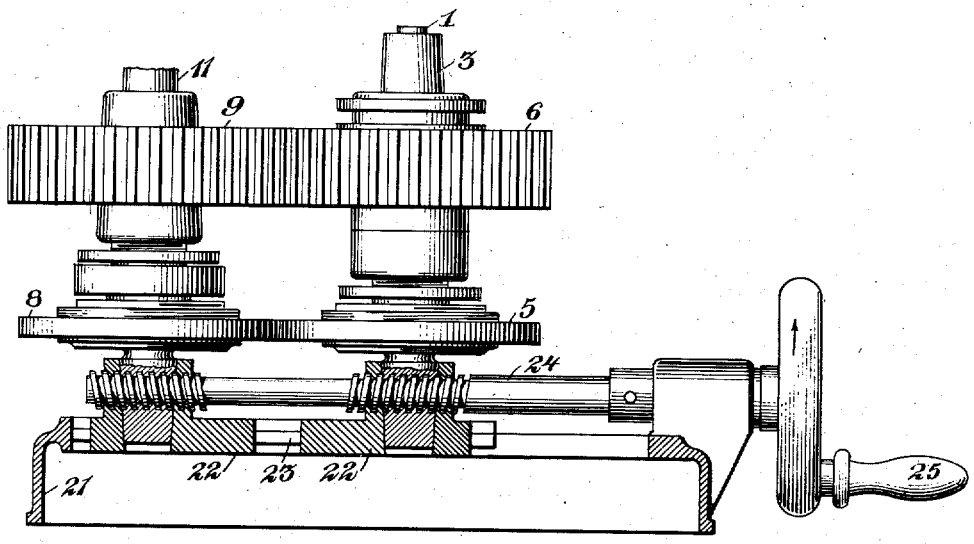
Figure 3:
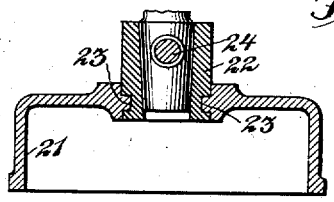
Figure 4:
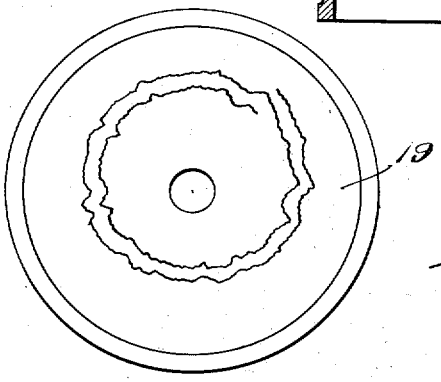

For the purpose of explaining the invention an example embodying the same has been shown in the accompanying drawing, in which Figure 1 is a vertical cross-section of the apparatus with a pair of gear wheels mounted thereon. Fig. 2 is a side elevation partly in section, the recording mechanism being omitted. Fig. 3 is a detail sectional view of the spindle bearing, and Fig. 4 is a view of a record made by the use of the apparatus.

In the example shown in the drawing my improved apparatus includes a pair of spindles, 1 and 2 which are mounted on a common frame or bed 21 so as to be shiftable relative toward and from each other but preferably held against rotation. The particular means employed for effecting the relative adjustment of the spindles is comparatively unimportant but is shown as including slides 22, both of which are shiftable in a suitable guide-way 23 formed on the bed 21. The two spindles are carried by the two slides and the latter are adapted to be moved toward and away from each other by means of a screw threaded spindle 24 mounted in a bracket on the bed and having a crank 25.

On the spindle 1 there is rotatably mounted a sleeve 3, a ball bearing 4 being interposed between these parts. Rotatably mounted on the other spindle 2 is a sleeve 7, there being a similar ball bearing interposed between these parts. Encircling the sleeve 7 is a second sleeve 11, the two sleeves being provided with an interposed ball bearing 10. The two sleeves 3 and 11 constitute the supports for the pair of gears to be tested. I have shown a pair of gears 6 and 9 detachably secured to these sleeves, the two spindles being adjusted in respect to each other so that the gears properly mesh.

For rotating the sleeve 7 from the gear 6 and at approximately the same speed as the sleeve 11 which carries the gear 9, I provide a pair of disks 5 and 8. These are preferably friction disks having their peripheries in direct driving engagement, the two disks being removable and of the same pitch diameters as the gears to be tested and held co-axial with the gears. The disk 5 is shown as rigidly but detachably secured to the sleeve 3, while the disk 8 is shown as rigidly but detachably secured to the sleeve 7.

The two co-axial sleeves 7 and 11 constitute parts of or serve to carry two controlling members for the indicating member. In the specific form illustrated the upper end of the sleeve 7 has a casing rigidly secured thereto and rotatable therewith. The casing, adjacent to the peripheral wall thereof, has a pivot bolt 14 parallel to the spindle 2 and serving as a pivot for an arm 15 extending across the casing. This arm terminates in a segment 16 provided with gear teeth meshing with a pinion 17 carried by a pivot member 28 mounted in the casing and also parallel to the spindle. This pivot member has rigidly connected thereto an arm 18 carrying at its end a stylus 26 which serves as an indicating member, it being so mounted as to trace indications on a record blank 19. This record blank is shown as non-rotatably secured to the upper end of the fixed spindle 2. To the upper end of the sleeve 11 there is keyed an arm 12 which is provided at its outer end with a finger 13 engaging in the bifurcated part 27 of the arm 15 which projects through a slot in the wall of the casing 20.

The operation of the apparatus is as follows:

The pair of gear wheels 6 and 9 to be tested are rigidly secured to the sleeves 3 and 11. Friction disks 5 and 8 having the same diameters as the pitch diameters of the gear wheels are secured to the sleeves 3 and 7. The spindles are then brought to the proper adjustment by means of the screw threaded spindle 24. The friction disks 5 and 8 will then be in direct driving engagement with each other and the gears 6 and 9 will be in proper mesh. The gear wheel 6, its supporting sleeve 3 and the friction disk 5 are then slowly rotated in any suitable manner as, for instance, by hand. The gear wheel 9 is driven by gear wheel 6 and the friction wheel 8 is driven by its frictional engagement with the disk 5. As long as the working faces of the teeth of the gear wheels are correct, the rotary movements of the gear wheel 9 and the friction disk 8 are exactly alike and there is, therefore, no relative rotary movement of the two co-axial sleeves 7 and 11. The casing 20 and the arm 12 which control the movement of the stylus rotate together and there is no relative movement of the segment 16 and pinion 17, and the stylus follows a direct path and draws a circle on the record blank 19. If the said working faces of the gears are incorrect, the uniform rotation of the gear wheel 6 will impart non-uniform or irregular movements to the gear wheel 9. As the friction disk 8, sleeve 7 and casing 20 are rotated by the gear 6, and the arm 12 is rotated by the gear 9, the non-uniform movement of the gear 9 in respect to the gear 6 will cause slight relative rotary movements of the arm 12 and the casing 20 and, therefore, the stylus 26 will be caused to move not only in a circular path around the spindle 2 but also in a curved path about the pivot member 28. Any slight accelerations and retardations of the gear 9 in respect to the gear 6 will cause oscillations or back and forth movements of the stylus. This oscillatory or back and forth movement of the stylus about the pivot member 28 will be recorded on the record blank 19 as a zig-zag line.

In Fig. 4 I have shown a record blank with such a zig-zag line thereon as may be produced by irregularity in the shape of the gear teeth faces. If the relative diameters of the disks and the gears be exactly the same, the line, after a single rotation of the gear 9, will come back to the starting point. If there be a very slight difference in the relative pitch diameters of the disks and the gears, the spiral will result as shown in Fig. 4.

In describing the invention reference has been made to an example in which the friction disks are mounted concentrically of the corresponding gear wheels. While I prefer this construction by reason of its simplicity and the exact operation, I wish it to be understood that my invention is not limited to this feature, and that various changes may be made in the general arrangement of the apparatus and the construction of its parts within the gist of my invention.

I claim herein as my invention:

1. In an apparatus for testing pairs of gear wheels, the combination with a pair of supports for said gear wheels for rotation thereof in engagement with each other, of a pair of friction disks the diameters of which are of the same ratio as the diameters of the pitch lines of the gear wheels and adapted for correct driving engagement with each other and one connected with one of the gear wheels for rotation in harmony therewith and the other one loose relatively to the other gear wheel, means to shift one of said supports to bring disks of different size into driving engagement, and means to record the relative displacements of the disk and gear wheel which are loosely mounted relatively to each other.

2. In an apparatus for testing pairs of gear wheels, the combination with a pair of supports for said gear wheels for rotation thereof in engagement with each other, of a pair of friction disks the diameters of which are respectively the same as those of the pitch lines of the gear wheels and adapted for correct driving engagement with each other and one connected with one of the gear wheels for rotation in harmony therewith and the other one loose relatively to the other gear wheel, means to shift one of said supports to bring disks of different size into driving engagement, and means to record the relative displacements of the disk and gear wheel which are loosely mounted relatively to each other.

3. In an apparatus for testing pairs of gear wheels, the combination with a pair of supports for said gear wheels for rotation thereof in engagement with each other, of a pair of friction disks the diameters of which are respectively the same as those of the pitch lines of the gear wheels and in correct driving engagement with each other and mounted respectively coaxially of the corresponding gear wheels and one connected with one of the gear wheels for rotation in harmony therewith and the other one loose relatively to the other gear wheel, means to shift one of said supports to bring disks of different size into driving engagement, and means to record the relative displacements of the disk and gear wheel which are loosely mounted relatively to each other.

4. In an apparatus for testing pairs of gear wheels, the combination with a pair of supports for said gear wheels for rotation thereof in engagement with each other, of a pair of disks the diameters of which are of the same ratio as the diameters of the pitch lines of the gear wheels and adapted for correct driving engagement with each other and one connected with one of the gear wheels for rotation in harmony therewith and the other one loose relatively to the other gear wheel, means to shift said gear wheels and disks into engagement with each other, and means to ascertain the relative displacements of the disk and gear wheel which are loosely mounted relatively to each other.

5. In an apparatus for testing the working faces of pairs of gear wheels, the combination with a pair of rotary members, and a sleeve rotatably mounted concentrically of one of said members, the other of said rotary members and the sleeve being adapted to have the gear wheels to be tested secured thereto in position for engagement with each other, of a pair of friction disks the diameters of which correspond respectively to the diameters of the pitch lines of the gear wheels and secured respectively to the rotary supports concentrically respectively of the corresponding gear wheels, and means to ascertain the relative displacements of the gear wheel which is mounted on the sleeve and the friction disk which is mounted on the concentric rotary member.

6. In an apparatus for testing the working faces of pairs of gear wheels, the combination with a pair of rotary members, and a sleeve rotatably mounted concentrically of one of said members, the other of said rotary members and the sleeve being adapted to have the gear wheels to be tested secured thereto in position for engagement with each other, of a pair of friction disks the diameters of which correspond respectively to the diameters of the pitch lines of the gear wheels and secured respectively to the rotary supports concentrically respectively of the corresponding gear wheels, a casing and an operating arm taking part respectively in the rotation of the sleeve and the support which is concentric thereof, and a rocking indicating member mounted on said casing and engaged by said arm.

7. In an apparatus for testing the working faces of pairs of gear wheels, the combination with a pair of rotary members adapted to have the gear wheels to be tested secured thereto in position for proper meshing engagement with each other, of a support and an operating arm rotatable about the same axis, a rocking indicating member mounted on said support and engaged by said arm, means for rotating said support from one of said gears, and means for rotating said operating arm from the other of said gears and at approximately the same speed as the speed of rotation of the casing.

8. In an apparatus for testing the working faces of pairs of gear wheels, the combination with a pair of rotary members adapted to have the gear wheels to be tested detachably secured thereto in position for meshing engagement with each other, of an indicating member mounted for movement about two independent axes, and a pair of rotatable co-axial controllers for said indicating member, one of said controllers being driven by one of said rotary members and the other of said controllers being driven by the other member at approximately the same speed whereby uniform rotation of said gears and controllers effects movement of said indicating member about one of its axes and non-uniform rotation of said gears and controllers effects movement of said indicating member about both of its axes.

9. In an apparatus for testing pairs of gear wheels, the combination with a pair of members for supporting gear wheels to be tested, of means to effect a relative movement of said members toward and from each other to bring gears of different sizes into driving engagement, a stationary record blank support, a stylus, driving connections between said stylus and one of said members for moving said stylus in respect to the axis of said record blank, and means connecting said stylus with the other gear support for imparting a secondary movement to the stylus upon relative rotary movements of said supports other than uniform movements at rates inversely proportional to the diameters of the pitch lines of the gears to be tested.

10. In an apparatus for testing pairs of gears wheels, the combination with a pair of supports for said gear wheels for rotation of the latter in meshing engagement, of a stationary record blank, a stylus carrying member rotated by one of said supports and a member rotated by the other of said supports at approximately the same speed as said first mentioned member and engaging with said stylus to move the latter in respect to the first mentioned member upon a variation in the relative rates of rotation of said gear and their supports.

11. In an apparatus for testing the working faces of pairs of gear wheels, the combination with a pair of rotary members adapted to have the gear wheels to be tested secured thereto, a record blank co-axial with one of said members, a stylus, a carrier therefor secured to one of said supports and means driven by the other support and rotatable with said stylus carrier for effecting a movement of the stylus in respect to its carrier upon accelerations or retardations of the speed of one support in respect to the speed of the other.

12. In a gear testing machine, the combination of means to support rotatively and in mesh the gears to be tested, a pair of rotating members mounted coaxially, one driven from one gear and the other driven from the other gear, and an indicating mechanism carried by one of said members and influenced by the other.

13. In a gear testing machine, the combination of means to support rotatively and in mesh the gears to be tested, a pair of rotating members mounted coaxially, one rigid with one gear and the other driven from the other gear, and an indicating mechanism carried by one of said members and influenced by the other.

14. In a gear testing machine, the combination of means to support rotatively and in mesh the gears to be tested, a pair of rotating members mounted coaxially, one rotated in harmony with one gear and the other driven from the other gear at approximately the same speed as that at which the first mentioned member is driven, and an indicating mechanism carried by one of said members and influenced by the other.

15. In a gear testing machine, the combination of means to support rotatively and in mesh the gears to be tested, a pair of rotating members mounted coaxially, one rotated in harmony with one gear, driving means between the other member and the other gear and including a pair of disks having diameters of the same ratio as those of the pitch circles of the gears, and an indicating mechanism having different movements produced by constant or varying relative movements of said members.

Signed at St. Gall, Switzerland, this 12th day of March, 1920.

HIPPOLYT SAURER.